(12) United States Patent
Greiner et al.

(10) Patent No.: US 7,987,027 B2
(45) Date of Patent: Jul. 26, 2011

(54) SYSTEMS FOR PROCESSING MACHINE HEALTH INFORMATION

(75) Inventors: Jonny Ray Greiner, Dunlap, IL (US); James Thomas McCarty, San Marcos, TX (US); William Todd Hasty, Manito, IL (US); Daniel Roy Hangartner, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 1458 days.

(21) Appl. No.: 11/411,893

(22) Filed: Apr. 27, 2006

(65) Prior Publication Data

US 2007/0252734 A1    Nov. 1, 2007

(51) Int. Cl.
G01M 17/00 (2006.01)
G06F 19/00 (2006.01)

(52) U.S. Cl. ........... 701/29; 701/30; 701/31; 701/32; 701/33; 701/34; 701/35; 73/1.59; 340/853.2; 340/854.6; 340/856.3; 340/539.21; 455/421; 455/513; 455/115.3; 455/134; 455/161.3; 455/226.2

(58) Field of Classification Search .............. None
See application file for complete search history.

(56) References Cited

U.S. PATENT DOCUMENTS

| 5,313,388 | A * | 5/1994 | Cortis ............... 701/35 |
| 5,438,329 | A | 8/1995 | Gastouniotis et al. |
| 6,246,948 | B1 * | 6/2001 | Thakker ............... 701/93 |
| 6,330,499 | B1 * | 12/2001 | Chou et al. ........... 701/33 |
| 6,600,430 | B2 | 7/2003 | Minagawa et al. |
| 6,671,589 | B2 | 12/2003 | Holst et al. |
| 6,680,922 | B1 * | 1/2004 | Jorgensen ............ 370/328 |
| 6,728,268 | B1 | 4/2004 | Bird |
| 2001/0034577 | A1 | 10/2001 | Grounds et al. |
| 2002/0181436 | A1 | 12/2002 | Mueckenheim et al. |
| 2003/0224840 | A1 | 12/2003 | Frank et al. |
| 2004/0142659 | A1 | 7/2004 | Oesterling |
| 2004/0181326 | A1 | 9/2004 | Adams et al. |
| 2004/0209618 | A1 | 10/2004 | Niemela et al. |

FOREIGN PATENT DOCUMENTS

EP    1209940 A1    5/2002

* cited by examiner

Primary Examiner — Khoi Tran
Assistant Examiner — Bhavesh V Amin (57) ABSTRACT

Methods and systems are provided for providing machine health information. In one embodiment, a machine may include a storage device that is configured to store collected machine health data. The storage device has a module that is configured to determine a data characteristic and a communication characteristic. The storage device is further configured to determine, based on the data characteristic and the communication characteristic, whether to transmit a set of machine health data to an off-board system. Further, the storage device is coupled to a transmitter that is configured to transmit the set of machine health data to the off-board system.

20 Claims, 3 Drawing Sheets

SYSTEMS FOR PROCESSING MACHINE HEALTH INFORMATION

TECHNICAL FIELD

This disclosure relates generally to processing machine information, and more particularly, to systems and methods for processing machine health information.

BACKGROUND

Machines, such as excavators, track type tractors, loaders, dozers, motor graders, underground loaders and trucks, generator sets, and other types of machinery, typically include equipment to collect and transmit information associated with the operation and status of the machine. The machines are often connected to a communication network that interfaces with off-board systems, such as a communication platform having a centralized information server for gathering and storing data received from one or more machines. In some instances, machine operation and status information is downloaded from the machine to the off-board system via a continual wireless connection. However, in locations where wireless connections are weak or unreliable, maintaining communications throughout the data download session has been a challenge. In these areas, data downloads of machine health information are often interrupted, resulting in lost or corrupted data. Accordingly, the session must be monitored to ensure that the downloads are correctly received. In addition, lost or corrupted downloads must be re-initiated, further increasing network traffic and reducing the available network bandwidth.

Problems arise particularly in enclosed work environments, such as mines, where low-frequency, low-bandwidth networks are typically used to transfer large data files, and where wireless availability may change rapidly depending on changes in machine location. In these environments, data files are often too large to be sent uninterrupted over the commonly used mobile equipment radio networks and infrastructures. The additional network traffic due to re-initiated transmissions further burdens the radio network and reduces its ability to support other communications.

One method of providing machine data to an off-board system is described in U.S. Pat. No. 6,671,589 (the '589 patent) issued to Holst et al. on Dec. 30, 2003. The '589 patent describes a system for collecting flight information during an airplane's flight. The system stores information during flight. Once the airplane has landed, the system wirelessly transmits the information to a ground-based node. While the system described in the '589 patent permits downloading data from an airplane to an off-board system, it fails to provide any mechanism to ensure that the messages are sent without interruption, and to account for weak or unavailable network conditions.

The disclosed systems and methods are directed to overcoming one or more of the problems set forth above.

SUMMARY OF THE INVENTION

In one aspect, the present disclosure is directed to a method for providing machine health data. The method includes collecting machine health data, determining a communication characteristic of a communication network connected to the machine and configured to communicate information between the machine and an off-board system, and determining a data characteristic associated with the machine health data. The method further includes determining, based on the communication characteristic and data characteristic, whether to transmit a first set of the collected machine health data to the off-board system. Based on the determination, the first set of machine health data is transmitted to the off-board system.

In another aspect, the present disclosure is directed to a system for providing machine health data. The system includes a machine having a storage device. The system further includes a communication network connected to the machine and configured to communicate information between the machine and an off-board system. The storage device is configured to store collected machine health data, and is coupled to a module. The module is configured to determine a communication characteristic of the communication network, determine a data characteristic associated with the machine health data, and determine, based on the communication characteristic and data characteristic, whether to transmit a first set of the stored machine health data to the off-board system. The system further includes a transmitter coupled to the storage device. The transmitter is configured to transmit the first set of machine health data to the off-board system.

In another aspect, the present disclosure is directed to an apparatus for providing machine health data. The apparatus includes one or more input ports and an input module for receiving machine health data via the one or more input ports. The apparatus further includes a storage module coupled to the input module and configured to store the machine health data. The apparatus further includes an output module coupled to the storage module. The output module is configured to determine, based on a communication characteristic of a communication network coupled to the apparatus and a data characteristic associated with the stored machine health data, whether to transmit a first set of the stored machine health data to an off-board system coupled to the apparatus by the communication network. The apparatus further includes a network interface coupled to the output module. The network interface is configured to facilitate transmission of the first set of the stored data to the off-board system.

DETAILED DESCRIPTION

Figure 1:
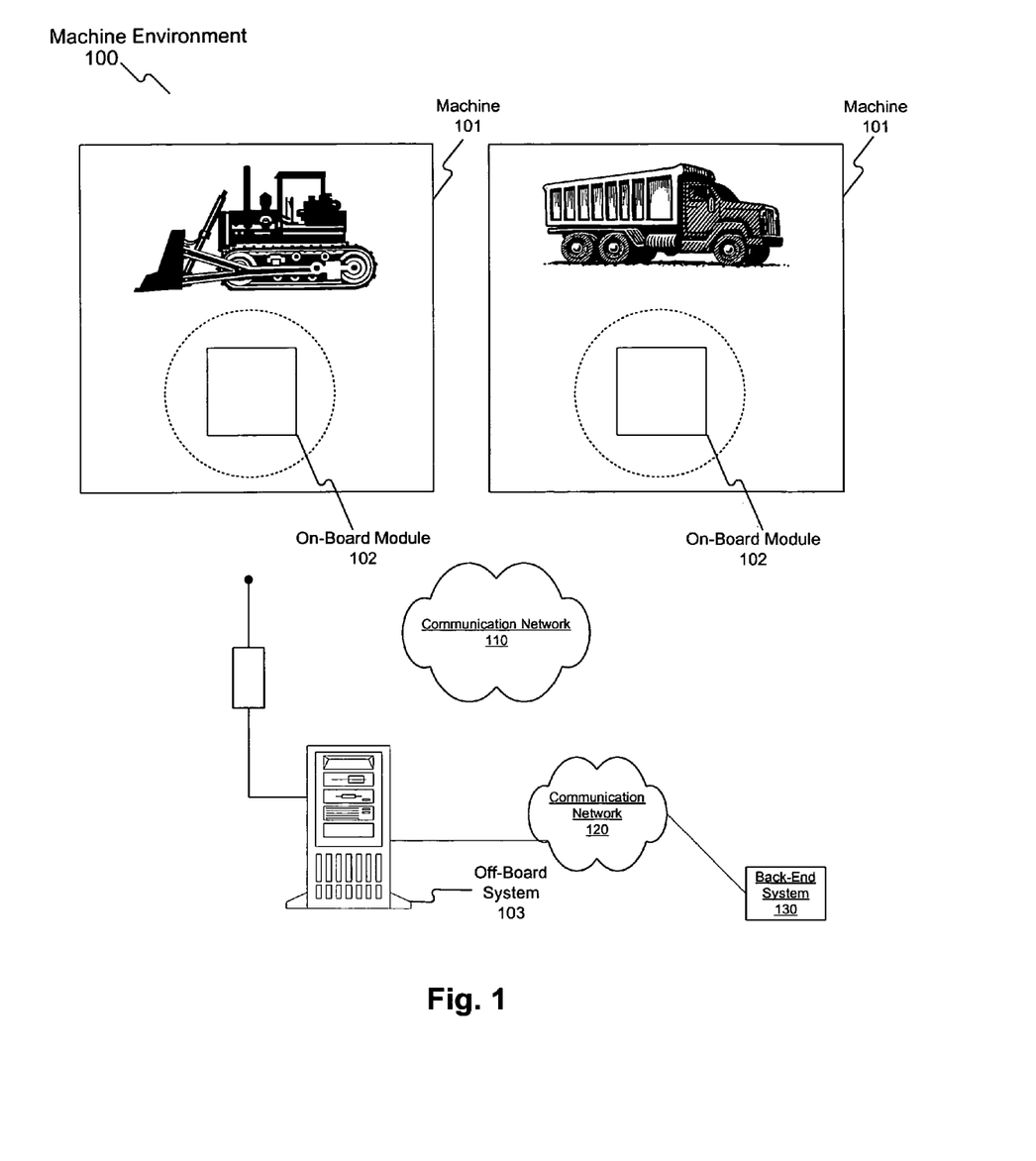
FIG. 1 illustrates an exemplary machine environment consistent with certain disclosed embodiments.

FIG. 1 illustrates a block diagram of an exemplary embodiment of a machine environment 100 consistent with certain disclosed embodiments. Machine environment 100 may include one or more machines that perform individual tasks that contribute to an environment task, such as mining, construction, power generation, transportation, agriculture, manufacturing, or any other type of task associated with other types of industries. For example, machine environment 100 may include one or more machines 101, each including an on-board module 102 for collecting and distributing data. Machine environment 100 may further include off-board system 103 for collecting information sent wirelessly over network 110 from each machine's respective on-board module 102. Network 110 may be any type of wireless communications link that communicates data, such as a wireless LAN, a satellite communication system, an infrared communication medium, etc. System 103 may be one or more computer systems configured to monitor, collect, and/or filter information received from machines 101 and to distribute the information to one or more back-end systems 130 using a network 120. Network 120 may be any type of wireless or wire-line computer network that communicates data, such as the Internet, an intranet, a Local Area Network (LAN), etc. Backend system 130 may be one or more computer systems configured to receive data for further processing. It is contemplated that additional and/or different components than those listed above may be included in machine environment 100.

A machine, as used herein, refers to a fixed or mobile machine that performs some type of operation, such as mining, construction, power generation, farming, etc. A non-limiting example of a fixed machine includes a stationary system operating in a particular environment (e.g., off-shore drilling platform, generator set, etc.). Non-limiting examples of mobile machines include machines that may travel, such as trucks, cranes, earth moving vehicles, mining vehicles, backhoes, material handling equipment, farming equipment, marine vessels, aircraft, and any type of movable machine.

On-board module 102, may be a system that collects and/or distributes information related to the operation and/or status of machine 101. On-board module 102 may be implemented with any appropriate hardware and/or software capable of performing one or more processes consistent with the disclosed embodiments. On-board module 102 may be coupled to any device or component, or group of devices or components, on machine 101 that sense, detect, analyze, and/or otherwise collect information related to the operation and/or status of machine 101 or one or more components of machine 101. For example, on-board module 102 may be coupled to an Electronic Control Module (ECM), a power system control module, a Global Positioning System (GPS) interface device, a stress or strain gage, a temperature sensor, and any other machine component.

Off-board system 103 may represent a system that is located remotely from machines 101. Off-board system 103 may be a system that connects to on-board module 102 directly through network 110. Alternatively, off-board system may connect to on-board module 102 indirectly through a combination of network 110 and other wireless and/or wire-line data communication links (e.g., satellite link, RF link, microwave link, infrared link, fiber optic or coaxial cable, etc.). Further, off-board system 103 may be a computer system including one or more computer system components, such as one or more processors, software components, display devices, interface devices, routers, etc., that operate collectively to perform one or more computer executable processes. Off-board system 103 may include one or more communications devices that communicate data to and from on-board module 102. Off-board system 103 may be located within work environment 100. Alternatively, off-board system 103 may be located remotely from work environment 100, or may be located partly within work environment 100 and partly remotely from work environment 100. In one embodiment, on-board module 102 may communicate with off-board system 103 using network 110 and one or more additional wireless and/or wire-line communication networks (e.g., satellite networks, RF networks, fiber optic or coaxial cable based networks, twisted pair telephone line networks, or any other type of communication network). Off-board system 103 may be further connected to network 120 via any type of communication link.

Figure 2:
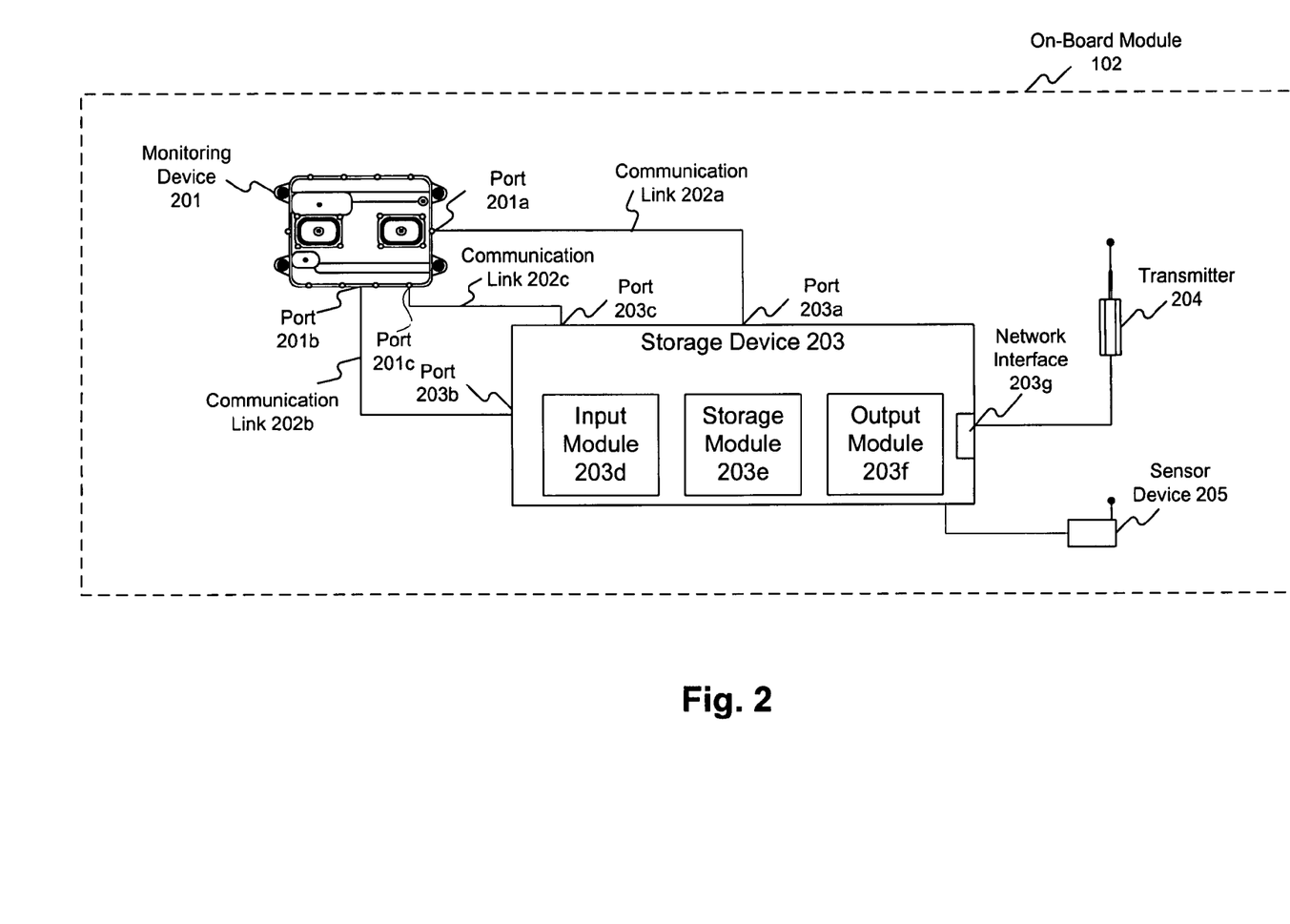
FIG. 2 illustrates an exemplary data processing system consistent with certain disclosed embodiments.

FIG. 2 illustrates a block diagram of an exemplary embodiment of on-board module 102 consistent with certain disclosed embodiments. On-board module 102 may include a monitoring device 201 coupled to one or more sensor components configured to collect, detect, and/or process data related to machine 101 or one or more components of machine 101. The term "coupled" as used herein refers to any direct or indirect connection that uses hardware and/or software to facilitate communications between components. Monitoring device 201 may be coupled to storage device 203 and may communicate with storage device 203 using one or more communication links 202a, 202b, 202c. Storage device 203 may be further coupled to wireless transmitter 204 and sensor device 205. Monitoring device 201, storage device 203, wireless transmitter 204, and sensor device 205 may be implemented with any type of hardware and/or software components, and may communicate using any type of communication medium (e.g., wired, wireless, etc.).

Monitoring device 201 represents a system including hardware and/or software configured to collect data from other machine components (not shown), such as sensors, detectors, analyzers, processors, or other devices. Monitoring device 201 may include software and/or hardware that polls the sensors, detectors, analyzers, processors, and/or other machine components at specified intervals (e.g., every 0.1 second, every second, randomly, etc.), to collect data related to machine 101. Monitoring device 201 may be further configured to receive unsolicited data from the machine components.

Monitoring device 201 may include one or more interface ports for communicating through one or more data links to storage device 203. For example, monitoring device 201 may include a telemetry port 201a coupled to data link 202a, a service port 201b coupled to data link 202b, and/or another port 201c coupled to data link 202c. Monitoring device 201 may send the collected data to storage device 203 via one or more of ports 201a, 201b, and 201c. Monitoring device 201 may send the collected data to storage device 203 periodically and/or as the data is received (e.g., every minute, every ten minutes, continuous data transmission, etc.), and may send the collected data to storage device 203 unsolicited, and/or in response to a request from storage device 203.

Ports 201a, 201b, and 201c may each be any type of hardware and/or software related interface ports configured to facilitate communication between monitoring device 201 and storage device 203. Each port may connect to proprietary and/or non-proprietary data links using proprietary or non-proprietary communication protocols. For example, in one embodiment, port 201a may be a telemetry port connected to a telemetry data link, port 201b may be a service port connected to a service data link, and port 201c may be another type of port connected to any type of industry standard type data link, such as, for example, a controller area network (CAN) data link, an RS-232 serial based data link, an RS-242 data link, etc. Ports 203a, 203b, and 203c associated with storage device 203 are similar to respective ports 201a, 201b, and 201c, in that they are configured facilitate communication between monitoring device 201 and storage device 203 over respective data links. For example, in one embodiment, port 203a may be a telemetry port connected to a telemetry data link, port 203b may be a service port connected to a service data link, and port 203c may be connected to any type of industry standard data link, such as, for example, a controller area network (CAN) data link, an RS-232 serial based data link, an RS-242 data link, etc. Although three ports and data links are shown, additional or fewer ports may be implemented with additional or fewer data links to provide communications between monitoring device 201 and storage device 203.

Storage device 203 may be implemented with hardware and/or software capable of performing one or more processes consistent with the disclosed embodiments. In one embodiment, storage device 203 may be a storage system including one or more computer system components, such as one or more processors, memory devices, interface devices, etc. In one embodiment, storage device 203 may be configured to collect data from monitoring device 201, store the data, and provide the data to a transmission component for transmission from machine 101. In one embodiment, storage device 203 may include an input module 203d, a storage module 203e, an output module 202f, and a network interface 202g.

Input module 203d may be hardware and/or software configured to receive data from ports 203a, 203b, and/or 203c, either in real-time, or at specified intervals. Input module 203d may thus be coupled to monitoring device 201 and may communicate with monitoring device 201 to permit data collection from monitoring device 201. Input module 203d may additionally be coupled to storage module 203e.

Storage module 203e may be hardware and/or software configured to store the data received from input module 203d. As a non-limiting example, storage module 203e may include one or more memory devices for storing large amounts of information (e.g., gigabytes, etc.). Storage module 203e may additionally be coupled to output module 203f and network interface 203g.

Output module 203f may be hardware and/or software configured to communicate with storage module 203e, network interface 203g, sensor device 205, and/or other system components. Output module 203f may be configured to analyze and assess a wireless signal detected by sensor device 205, characteristics of the data stored in storage module 203e, and other criteria related to transmitting the data stored in storage module 203e. Output module 203f may be further configured to process and provide data stored in storage module 203e through network interface 203g to transmission device 204 for transmission to off-board system 103. Although modules 203d, 203e, and 203f are shown as separate modules, they may be configured as a single component. For example, in one embodiment, modules 203d, 203e, and 203f may be implemented on a single machine component, such as a computer system including one or more processors, interface devices, storage devices, and software applications.

Network interface 203g may be any type of interface device configured to communicate data from output module 203f to a transmitter device, such as transmitter 204. Network interface 203g may be implemented with any hardware and/or software capable of performing one or more processes consistent with the disclosed embodiments. For example, in one embodiment, network interface 203g may be an Ethernet interface which is coupled to a wireless data transmitter 204 (e.g., a satellite transmitter, RF transmitter, microwave transmitter, infrared transmitter, etc.) for communicating with off-board system 103. Although only one network interface and transmitter is shown, on-board module 102 may include a number of network interfaces and/or transmitters to provide communications between storage device 203 and off-board system 103. Furthermore, although network interface 203g and wireless data transmitter 204 are shown as separate, network interface 203g and wireless data transmitter 204 may be integrated into one physical device.

Transmitter 204 may be any type of transmitter and/or transceiver configured to communicate information wirelessly to/from off-board system 103. For example, transmitter 204 may be a satellite transmitter, an RF transmitter, a microwave transmitter, an infrared transmitter, etc. Transmitter 204 may be configured to receive information from off-board system 103, such as messages including requests for machine health data collected by on-board module 102. Sensor device 205 may be any type of sensor coupled to storage device 203 and configured to detect, sense, and/or analyze a wireless communication signal available at the machine. For example, sensor device 205 may sense the availability and/or strength of a satellite communication signal at machine 101 that may be used to communicate the data stored in storage device 203 to off-board system 103. Sensor device 205 may be integrated into transmitter 204, may be a separate device, or may be integrated into any other component of machine 101.

The configuration of on-board module 102 is not limited to that depicted in FIG. 2. For example, on-board module 102 may include fewer or additional components. Further, the components of on-board module 102 may communicate using any known technology, such as wireless (e.g., short-range wireless such as Bluetooth, infrared communications, etc.), wire-line (e.g., RS-232 serial based data links, Controller Area Network, etc.), or any other type of communication technology. As another example, certain components may be combined into a single component. For example, in one embodiment, transmitter 204 may be integrated into the same physical component as storage device 203.

Figure 3:
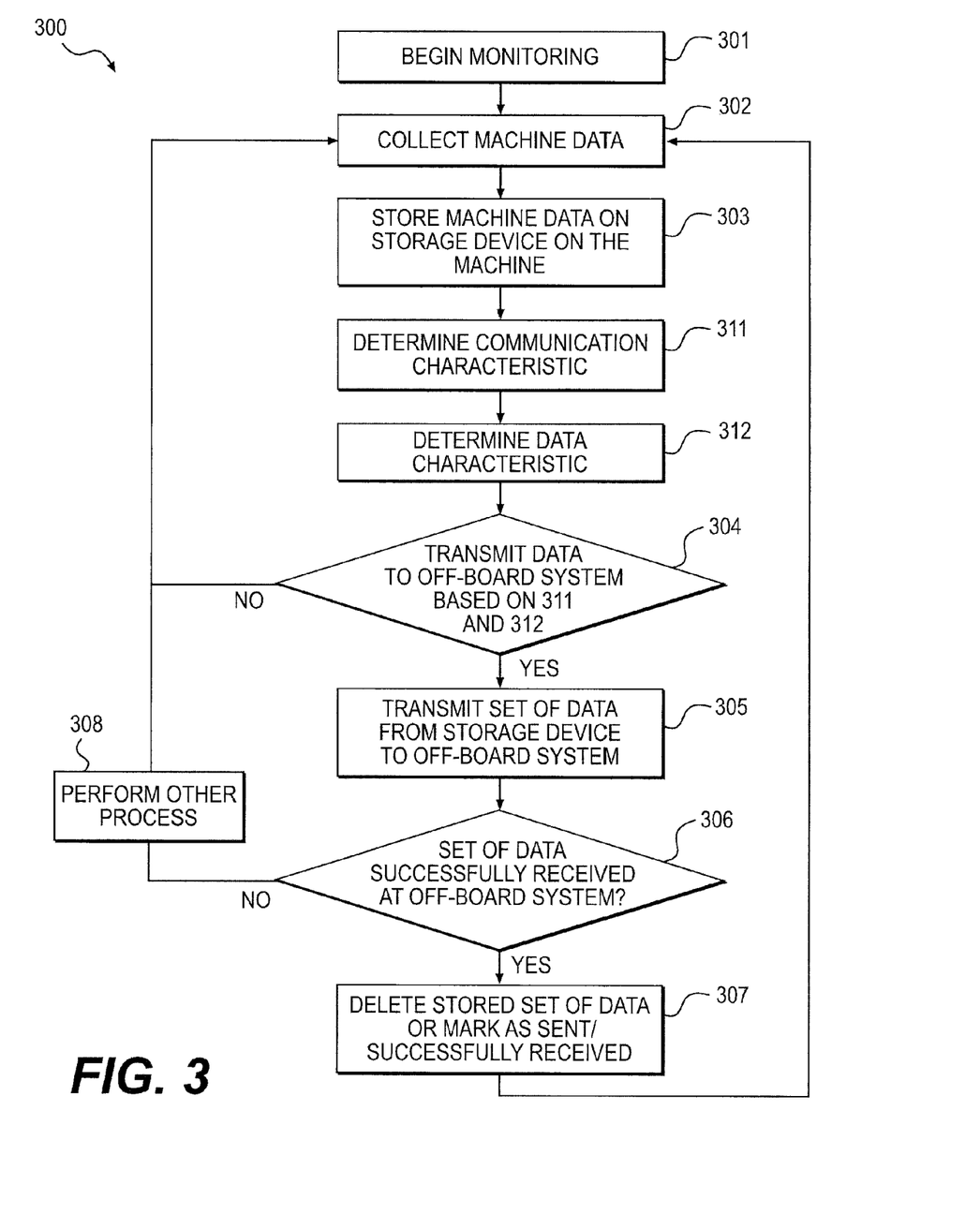
FIG. 3 illustrates an exemplary method for processing machine information consistent with certain disclosed embodiments.

FIG. 3 illustrates a flowchart of an exemplary a method 300 of distributing machine health information, consistent with certain embodiments. In step 301, on-board module 102 begins monitoring machine 101 to collect, for example, machine health data. Step 301 may be performed when machine 101 begins operation, when on-board module 102 begins operation, when on-board module 102 receives a command to begin monitoring, or for any other type of initiation event.

In step 302, monitoring device 201 collects data related to machine health (e.g., operating parameter information, etc.). In one embodiment, monitoring device 201 may collect the data at predetermined specified intervals (e.g., every 0.1 seconds, every second, at random intervals, etc.). Alternatively, or additionally, monitoring device 201 may collect the data in response to an alarm, warning, flag, or any other type of signal representing some condition associated with machine 101. Further, monitoring device 201 may collect the data in response to a command issued from a software or hardware component and/or a user. Monitoring device 201 may temporarily store the collected data in a memory device located in monitoring device 201.

In step 303, monitoring device 201 may provide the collected data to storage device 203 via one or more ports 201a, 201b, 201c, and their associated data links. In one embodiment, monitoring device 201 may provide the collected data to storage device 203 at specified intervals (e.g., every minute, every ten minutes, etc.). In another embodiment, monitoring device 201 may provide the collected data to storage device 203 in real-time (e.g., as the data is collected by monitoring device 201, etc.). In one embodiment, monitoring device 201 may provide the collected data as a combination of real-time data and previously stored data that is scheduled for reporting to storage device 203 at specified intervals. For example, in one embodiment, alarm data (e.g., component stress level is above a particular threshold, etc.) and warning data (e.g., engine is near maximum heat threshold, etc.) may be sent from monitoring device 201 to storage device 203 in real-time, along with non-critical data (e.g. stress levels and engine heat readings not near threshold levels) designated for periodic reporting. Further, monitoring device 201 may automatically send the collected data, or may send the data in response to a request or command received by monitoring device 201 (e.g., a request from input module 203*d*, an alarm or warning command from a user or a machine component, etc.). Storage device 203 may store the received collected data in storage module 203*e*.

In certain embodiments, storage device 203 executes software that determines whether to provide a set of the stored data to off-board system 103 (step 304). For example, output module 203*f* may execute software to determine whether to wirelessly transmit a set of data stored in storage module 203*e* to off-board system 103. In one embodiment, to determine whether to transmit the set of data, output module 203*f* may receive and analyze information reflecting one or more criteria. The criteria may include one or more communication characteristics and/or data characteristics (step 311 and step 312). A communication characteristic may be a characteristic associated with a communication network connected to the machine (e.g., signal strength and/or reliability level of a wireless communication signal received by the machine and used to communicate information between the machine and the off-board system, available data rate and/or bandwidth of the communication medium or network used to communication information between the machine and the off-board system, ground speed of the machine if it is moving within the network, etc.). A data characteristic may be a characteristic associated with the machine health data stored in storage device 203, such as the size of the set of data to be transmitted, the type of data included in the data set or stored in storage device 203, the format of the stored data, etc. The criteria may further include any other types of information related to communicating the data to off-board system 103. In one embodiment, output module 203*f* may receive continuous or periodic requests (e.g., "push" requests from storage device 203, "pull" requests from off-board system 103, commands from monitoring device 201, etc.) to begin transmitting data stored in storage module 203*e* to off-board system 103. In response, based on the one or more criteria, output module 203*f* may determine whether to transmit the data to off-board system 103.

As a non-limiting example, output module 203*f* may be configured to monitor a wireless signal strength and/or wireless signal reliability level detected by sensor device 205. Sensor device 205 may detect a certain level of signal strength and/or reliability based on, for example, the signal type, the location of machine 101 within a communication network, the speed of the machine traveling within a given network (e.g., network 120), and/or other indicia. Output module 203*f* may additionally determine an available data transmission rate related to the type of transmission medium implemented by communication network 110.

In one embodiment, in response to a request or command to begin data transmission, output module 203*f* may determine an amount of data that can be sent from storage device 203 and received by off-board system 103 with minimal or no interruption based on, for example, one or more communication and data characteristics, such as network signal strength, signal reliability, and/or available data rate. For example, output module may determine that for a 10 Mbps transmission medium and a particular signal strength, a maximum of 2 megabytes of data can be transmitted with a certain likelihood of no interruption. Output module 203*f* may then determine a set of data for transmission. In one embodiment, output module 203*f* may determine the set of data based on the data stored in storage device 203 (e.g., the oldest 2 megabytes of data stored in storage module 203*e*). In another embodiment, output module 203*f* may determine the set of data based on a request from a component of machine 101 and/or off-board system 103 to receive/transmit machine health data. Once determined, output module 203*f* may transmit the set of data from storage device 203 to the off-board system 103.

In another embodiment, output module 203*f* may determine a probability (e.g., 50%, 80%, 90%, etc.) that a determined set of data to be transmitted will be successfully transmitted to off-board system 103 without interruption. In one embodiment, output module 203*f* may determine the probability based on one or more communication characteristics and/or data characteristics. For example, output module 203*f* may execute software that determines that a 2 megabyte set of machine health data may have a 90% chance of being successfully transmitted to off-board system 103 without interruption for a machine traveling at a ground speed of 2 mph and communicating over a 10 Mbps transmission medium having a high signal strength. Output module 203*f* may also execute software that analyzes the determined probability against a predetermined threshold probability value(s) to determine whether to transmit the set of data. For instance, if the predetermined threshold probability value is 95%, output module 203*f* may determine not to transmit the set of data. On the other hand, if the predetermined threshold probability value is 80%, output module 203*f* may determine to transmit the set of data. Thus, based on the probability of successful transmission, output module 203*f* may select the set of data to transmit from storage device 203. In another embodiment, output module 203*f* may alter the set of data to be transmitted based on the probability. That is, in the above example, output module 203*f* may determine that if the 2 megabytes of machine health data is reduced to 1 megabyte, the transmission probability is increased to 95%. Thus, in the example where the threshold probability value is 95%, output module 203*f* may adjust the size of the data set to increase the likelihood of successful transmission, and in turn, transmit the adjusted data set accordingly.

Output module 203*f* may be configured to determine the probability of transmission using different techniques and mechanisms. For instance, output module 203*f* may maintain a map of communication characteristics and data characteristics with corresponding transmission probability values. Alternatively, output module 203*f* may implement inference software, neural networks, knowledge base/expert systems, etc., to determine the probability of transmission. The disclosed embodiments are not limited to the above examples.

If output module 203*f* determines not to transmit data stored in storage module 203*e* to off-board system 103 (step 304, no) (e.g., the size of a data set is too large to be transmitted uninterrupted; the probability of off-board system 103 successfully receiving a transmitted set of data without interruption is below a particular threshold, etc.), storage device 203 may continue to collect machine health data (step 302) and wait until the next command or request to transmit data. However, if output module 203*f* determines to transmit a set of the stored data to output module 203*f* (step 304, yes) (e.g., the size of the data set is below a particular value and the signal strength is above a particular level; the probability of off-board system 103 successfully receiving a set of data uninterrupted is above a particular threshold), then method 300 continues to step 305.

In step 305, output module 203*f* may transmit the set of data stored in storage module 203*e* to off-board system 103. In one embodiment, the set of data may be sent via network interface 203*g* and transmitter 204, using a designated protocol and transmission medium. In one embodiment, as a non-limiting example, output module 203*f* may send the set of data via a file transfer protocol ("FTP") over a satellite communication link using an Ethernet interface connected to a satellite transmitter. Any other known communication protocol and/or transmission link may be implemented and the above example is not intended to be limiting.

In step 306, on-board module 102 and/or off-board system 103, or a combination of the two determines whether the transmitted set of data was successfully received at off-board system 103. For example, off-board system 103 and on-board module 102 may exchange acknowledgment messages based on the type of protocol used to send the set of data. If the set of data was successfully received (step 306, yes), on-board module 102 and/or off-board system 103 may request storage device 203 to delete the set of data stored in storage module 203e corresponding to the data successfully received, or to otherwise mark the set of data as sent or successfully received (step 307). The method then continues to collect machine health data (step 302).

On the other hand, if the data is not successfully received by off-board system 103 (step 306, no), then storage device 203 may perform an additional process (step 308) to ensure that the data set is later successfully received by off-board system 103. For example, storage device 203 may mark the set of data with a flag reflecting that the data set was not successfully transmitted to off-board system. Thus, at some later time when output module 203f determines to transmit a second set of data, the first set of data (e.g., the data set unsuccessfully transmitted) may be transmitted as part of or along with the second set of data in a manner consistent with the processes disclosed above in connection with FIG. 3. Alternatively, the first set of data may be transmitted before the second set of data. In another embodiment, based on a failed attempt to successfully transmit the set of data to off-board system 103, storage device 203 may break the first set of data into smaller portions and attempt to transmit those smaller sets of data in manner consistent with the processes disclosed above in connection with FIG. 3.

In one embodiment, storage device 203 and/or off-board system 103 may keep a log of successful and failed transmissions, including statistical data associated with the transmission (e.g., detected signal strength and/or reliability at the time of the transmission, data size of the set of data unsuccessfully transmitted, transmission protocol used, machine ground speed, etc.), and may use this information to improve future transmission reliability. In one embodiment, output module 203f may include computer software to implement an automated learning process that improves future decision-making based on transmission information stored in the log. For example, the logged information may be used to update, train, etc. the software and information used by output module 203f to determine a transmission probability.

INDUSTRIAL APPLICABILITY

Methods and systems related to the disclosed embodiments may be applicable to any environment including machine components that collect and distribute information related to a machine's status and operation. For example, in one embodiment, on-board module 102 may be used to collect and distribute health information from a machine used in mining, construction, or other industrial environments. For the purposes of this application, "machine health data" may refer to any type of data collected from a machine or a component of a machine. The machine health data may be used to determine or diagnose physical conditions, operational conditions, or other status of a machine or any of its components. Machine health data may include raw data taken from a sensor, data processed by a machine component, data derived in a data control system component, etc. For example, machine health data may reflect any type of machine parameter, such as load, stress, fluid levels, speed, torque, power, voltage, current, usage time, engine temperature, fuel consumption, etc. Further, the term "data characteristic" may be one or more data characteristics and the term "communication characteristic" may be one or more communication characteristics.

Systems and methods consistent with the disclosed embodiments thus reduce the number of interrupted transmissions that occur in machine environments, resulting in less corrupted or lost information. Further, the disclosed embodiments may reduce network traffic resulting from machine data transmission, thereby increasing the bandwidth available for other types of network communications.

It will be apparent to those skilled in the art that various modifications and variations can be made to the systems and methods disclosed herein. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A method for providing machine health information, comprising:
   collecting machine health data on-board a machine;
   determining a communication characteristic of a communication network used to communicate information between the machine and an off-board system, the communication characteristic being indicative of an available signal transmission capability of the communication network to communicate information between the machine and the off-board system;
   determining a data characteristic associated with the machine health data;
   determining, based on the communication characteristic and the data characteristic, whether to transmit a first set of the collected machine health data to the off-board system; and
   transmitting the first set of machine health data to the off-board system based on the determination of whether to transmit the first set of data.

2. The method of claim 1, wherein the communication characteristic includes one or more of a signal strength of a communication signal received by the machine and used to communicate information between the machine and the off-board system over the communication network, a signal reliability level of the communication signal, available bandwidth of the communication network, available data rate of the transmission medium used by the communication network, and a ground speed of the machine.

3. The method of claim 1, further including:
   storing the collected machine health data on a storage device on the machine;
   receiving a request at the storage device to begin transmitting machine health data from the storage device to the off-board system; and
   determining, in response to the request and based on the communication characteristic and data characteristic, whether to transmit the first set of the collected machine health data to the off-board system.

4. The method of claim 1, wherein determining whether to transmit the first set of machine health data includes:
   determining the size of the first set of machine health data; and
   analyzing the size of the first set of machine health data and a signal strength of a communication signal received by the machine and used to communicate information between the machine and the off-board system.

5. The method of claim 1, wherein determining whether to transmit the first set of machine health data includes:
determining a probability that the first set of machine health data will be successfully transmitted to the off-board system without interruption, and wherein the method further includes:
transmitting the first set of machine health data to the off-board system if the probability is above a threshold value.

6. The method of claim 1, further including:
confirming whether the first set of machine health data is successfully transmitted to the off-board system; and
if the first set of machine health data is successfully transmitted to the off-board system, then performing at least one of:
deleting the first set of machine health data from the storage device, and
setting a first flag associated with the first set of machine health data stored in the storage device reflecting that the first set of machine health data was successfully transmitted.

7. The method of claim 6, further including:
if it is not confirmed that the first set of machine health data was successfully transmitted to the off-board system, then:
setting a second flag associated with the first set of machine health data stored in the storage device reflecting that the first set of machine health data was not successfully transmitted; and
transmitting the first set of machine health data to the off-board system with a second set of machine health data collected by the machine.

8. The method of claim 7, wherein transmitting the first set of machine health data with the second set of machine health data includes:
receiving a request to transmit machine health data stored in the storage device;
determining whether to transmit the first and second sets of machine health data to the off-board system based on a second determined data characteristic and a second determined communication characteristic.

9. The method of claim 7, further including:
storing a record of each successful machine health data set transmission and each unsuccessful machine health data set transmission in a log, and generating statistical data associated with each successful and unsuccessful transmission.

10. A system for providing machine health information, comprising:
a machine;
a storage device located on board the machine, the storage device configured to store collected machine health data;
a communication system associated with the machine and configured to communicate information between the machine and an off-board system through a communication network, wherein the communication system is further configured to:
determine a communication characteristic of the communication network, wherein the communication characteristic includes a signal strength of a communication signal used to communicate information between the machine and the off-board system;
determine a data characteristic associated with the machine health data, wherein the data characteristic includes a size of the machine health data that can be communicated through the communication network based on the determined communication characteristic; and
determine, based on the communication characteristic and the data characteristic, whether to transmit a first set of the stored machine health data to the off-board system; and
a transmitter, coupled to the storage device, and configured to transmit the first set of machine health data to the off-board system.

11. The system of claim 10, wherein the communication system is further configured to:
receive a request to begin transmission of machine health data from the storage device to the off-board system; and
determine, in response to the request and based on the communication characteristic and data characteristic, whether to transmit the first set of the collected machine health data to the off-board system.

12. The system of claim 10, wherein the communication system is further configured to determine a probability that the first set of machine health data will be successfully transmitted to the off-board system without interruption, and
the transmitter is configured to transmit the first set of machine health data to the off-board system if the probability is above a threshold value.

13. The system of claim 10, further including a monitoring device coupled to the storage device and configured to collect the machine health data and provide the collected machine health data to the storage device at specified intervals.

14. The system of claim 10, wherein the communication system is further configured to:
receive a confirmation of successful transmission of the first set of machine health data; and
based on the confirmation, at least one of:
delete the first set of machine health data, and
set a first flag associated with the first set of machine health data.

15. The system of claim 14, wherein the communication system is further configured to set a second flag associated with the first set of machine health data stored in the storage device if the confirmation is not received, and the transmitter is further configured to transmit the first set of machine health data to the off-board system with a second set of machine health data collected by the machine.

16. The system of claim 15, wherein the communication system is further configured to receive a request to transmit machine health data stored in the storage device, and to determine whether to transmit the first and second sets of machine health data to the off-board system based on a second determined data characteristic and a second determined communication characteristic.

17. An apparatus for providing machine health information, comprising:
one or more input ports;
an input module for receiving machine health data via the one or more input ports;
a storage module coupled to the input module and configured to store the received machine health data;
a sensor adapted to detect a communication characteristic of a communication network used to communicate the machine health data to an off-board system located outside the apparatus, wherein the communication characteristic is indicative of an available signal transmission capability of the communication network to communicate information between the apparatus and the off-board system;

an output module coupled to the storage module and configured to partition the stored machine health data into a plurality of data sets based on the communication characteristic, and identify a first data set of the plurality of data sets to communicate to the off-board system before communicating other data sets of the plurality of data sets based on the communication characteristic; and a network interface coupled to the output module and configured to facilitate transmission of the first data set to the off-board system.

18. The apparatus of claim 17, wherein the detected communication characteristic includes one of a signal strength of a communication network, a signal indicative of the reliability of the communication network, available bandwidth of the communication network, and an available data transmission rate of the communication network.

19. The apparatus of claim 17, wherein the network interface is configured to transmit the first data set to the off-board system without transmitting the other data sets of the plurality of data sets if the output module determines that a probability that the other data sets will be successfully transmitted to the off-board system without interruption is below a threshold probability.

20. The apparatus of claim 19, wherein the output module is configured to identify the first data set based on a size of the data that can be communicated based on the detected communication characteristic.

* * * * *